Feb. 2, 1965 P. A. NILSEN ETAL 3,168,598
APPARATUS FOR MAKING WHIPPED CREAM
Filed Nov. 2, 1960 2 Sheets-Sheet 1
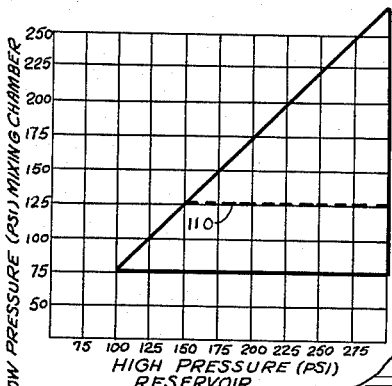
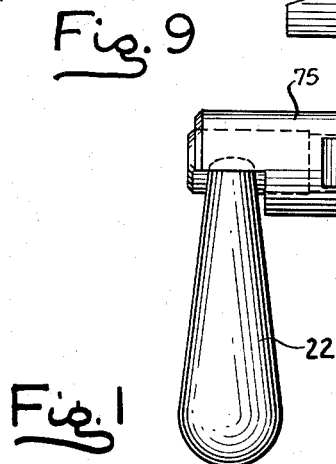
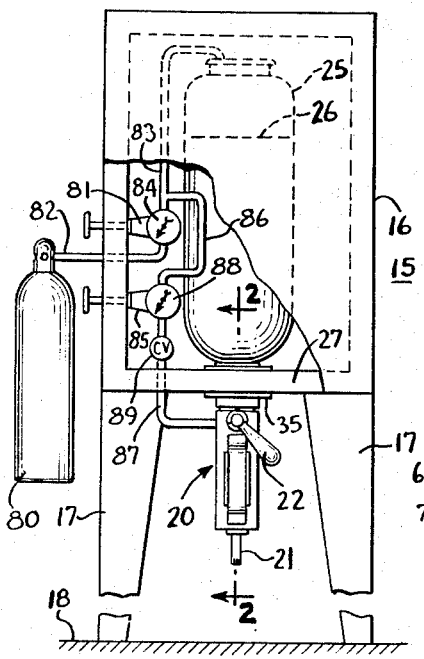
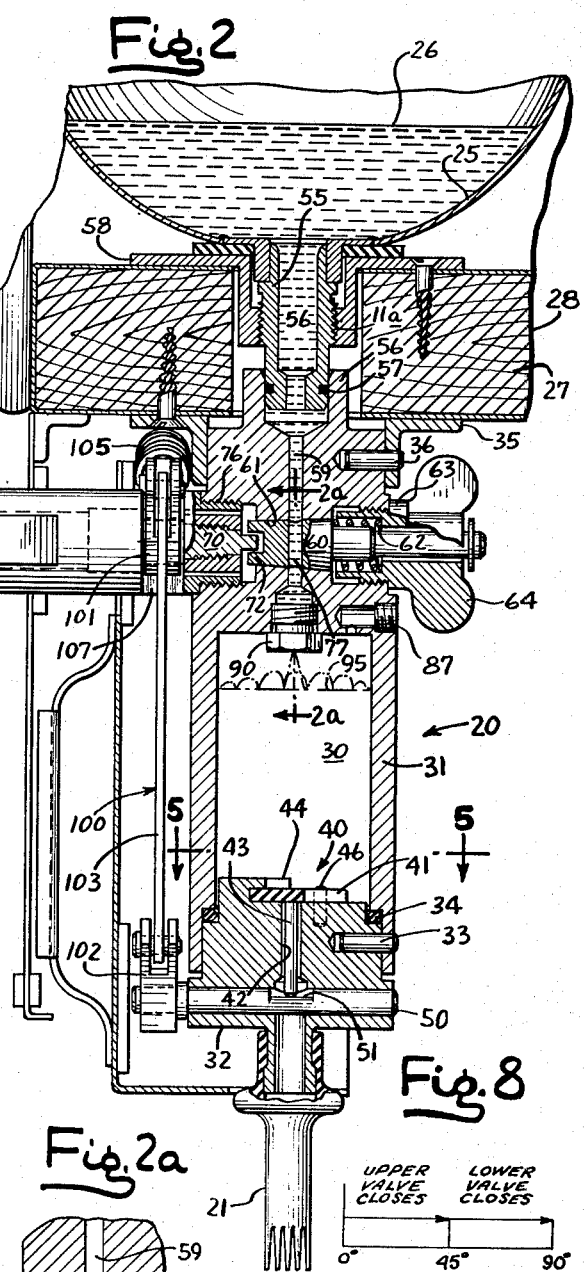
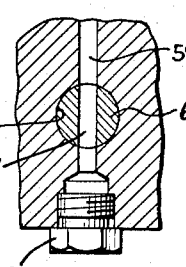
INVENTORS
PETER A. NILSEN
THEODORE R. SCHULZ
BY Wolfe, Hubbard, Voit & Osann
ATTYS.

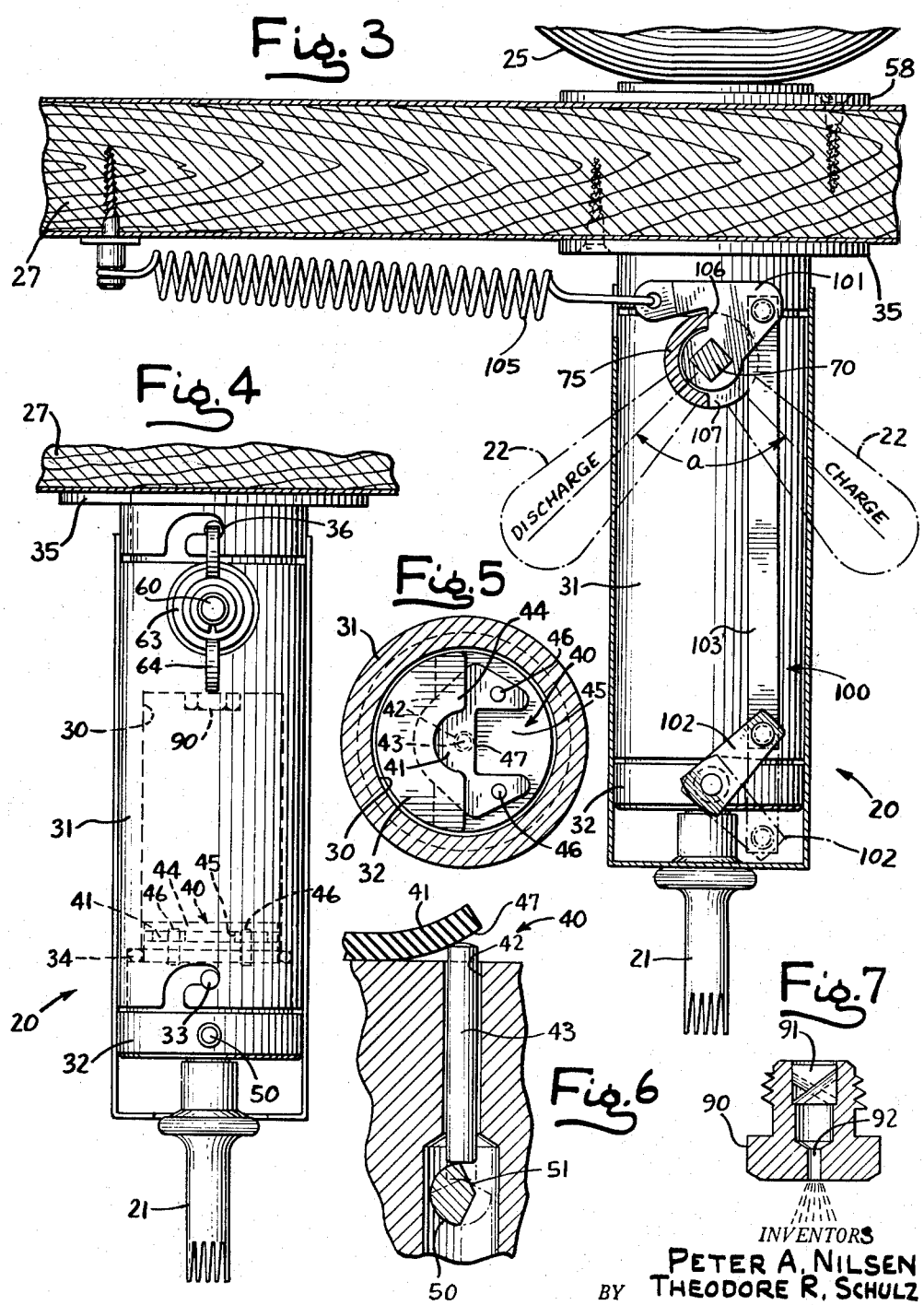

United States Patent Office 3,168,598
Patented Feb. 2, 1965

3,168,598
APPARATUS FOR MAKING WHIPPED CREAM
Peter A. Nilsen, Villa Park, and Theodore R. Schulz, Prospect Heights, Ill., assignors, by mesne assignments, to Nilsen Mfg. Co., Haines City, Fla., a corporation of Florida
Filed Nov. 2, 1960, Ser. No. 66,748
2 Claims. (Cl. 261—51)

The present invention relates to the making of whipped cream and more particularly to an improved apparatus for making whipped cream by aeration with pressurized gas.

It is an object to provide a cream whipping apparatus which is particularly suited for production of whipped cream from liquid cream in individual sized portions at the point of use. It is another object to provide a cream whipping device suitable for soda fountain and restaurant use which may be easily operated by a waitress and which acts almost instantaneously upon movement of a control member to convert a measured amount of liquid cream to a serving of whipped cream. It is a related object to provide a cream whipping device which supplies whipped cream on demand, serving by serving, enabling a single conveniently located machine to supply the needs of an entire staff of waitresses in a large restaurant or the like.

It is another object to provide a cream whipping device which enables the cost per serving of whipped cream to be reduced to the minimum, i.e., to a price which is a small fraction of that of commercial whipped cream in pressurized containers. It is a more specific object to provide an improved cream whipping device which whips cream only as needed and which may be recharged with solid cream depending upon the demand and which therefore enables the user to avoid carrying a large inventory of the relatively expensive commercial product in anticipation of a special need which may not materialize. Since liquid cream is readily available, the whipping device may be kept supplied under all conditions.

It is a further object to provide a cream whipping device which is capable of producing a more satisfactory grade of whipped cream than is usually served in fountains or the like, with the proper degree of "overrun," neither too fluffy nor too rich. It is a related object to provide a cream whipping device in which the consistency of the final product may be adjusted to achieve optimum conditions. It is a still further object related to the foregoing to provide a cream whipping device which produces a serving or batch of whipped cream in which all portions thereof have the same consistency and without any liquid "tail" at the end of the discharge cycle. It is an object to provide a novel cream whipping device in which the above desirable features are obtained, and in which the gas is uniformly mixed with the cream, without externally applied agitation or shaking and hence without the mechanical complication of paddle wheels, vibratory mounts or the like. Moreover, the device is completely silent in operation.

It is an object of the invention in one of its aspects to provide a novel cream whipping machine which is inherently inexpensive in construction which is a self-contained, free-standing unit, and which is easily disassembled to expose all surfaces for periodic cleaning. It is moreover an object to provide a cream whipping device which meets the rigid requirements of health and regulatory bodies.

It is a detailed object of the present invention to provide a cream whipping device which is not only easy to use but which is safer for personnel than the use of pressurized cans.

Finally it is an object to provide a cream whipping apparatus in which cream is stored in liquid form thus substantially reducing its need for refrigeration.

Other objects and advantages of the invention will become apparent upon reading the following detailed description and upon reference to the drawing in which:

FIGURE 1 is a front elevation of a cream whipping machine constructed in accordance with the invention;

FIG. 2 is a fragmentary vertical section taken along line 2—2 in FIG. 1;

FIG. 2a is an exploded section taken along line 2a—2a in FIG. 2 showing the upper valve and nozzle structure;

FIG. 3 is a front view of the mixing and batching chamber with the handle and cover removed to reveal the details of construction;

FIG. 4 is a back view of the mixing and batching chamber;

FIG. 5 is a top view of the flap for the valve at the bottom of the chamber taken along the line 5—5 in FIG. 2;

FIG. 6 is an enlarged fragmentary section showing the bottom flap valve and operator therefor;

FIG. 7 is a fragmentary axial section through a preferred inlet nozzle or spray head;

FIG. 8 is a graph depicting the effect of the angular movement of the handle; and FIG. 9 is a graphical representation of the different consistencies of whipped cream secured at specific pressure coordinates.

Turning to the drawings, FIG. 1 shows a cream whipping device 15 constructed in accordance with the invention. It is contained in a housing 16 having legs 17 for support on a counter or other surface 18. Projecting downwardly from the housing 16 is a whipping assembly 20 having a discharge nozzle 21 which is under the control of a handle 22. As will be discussed in detail, moving the handle from the extreme right hand to the extreme left hand position results in discharge of a single serving of whipped cream from the nozzle 21.

Contained within the housing 16 is a vertically arranged storage vessel 25 in which liquid cream 26 is stored prior to feeding the same to the whipping assembly 20. The storage vessel, which may have a capacity of several gallons of liquid cream, is supported in an inverted position on the bottom wall or platform 27 of the housing 16. The remaining walls of the housing are preferably insulated as indicated at 28 and the unit may be refrigerated either by ice or by a cooling coil connected to a refrigeration system.

In practicing the invention, the whipping assembly 20 includes a batching or mixing chamber 30 (FIG. 2) in the form of a cylinder having a hollow body 31 and a base portion or insert 32 interconnected by a bayonet connection 33 and sealed by an O-ring 34. At its upper end the body is secured to a mounting flange 35 by a bayonet connection 36, with the flange being screwed or otherwise secured to the underside of the platform 27. Included in the base portion 32 is a discharge valve generally indicated at 40 leading to the discharge nozzle 21 previously referred to.

In the preferred embodiment, the valve 40 is of the "flap" type having a rubber flap member 41 sealing an outlet orifice 42, with a release plunger 43 extending upwardly through the orifice into contact with the underside of the flap member. For the purpose of keeping the rubber flap seated on the base member 32, an overhang 44 is formed on the upper surface of the base member. The flap is scalloped out as indicated at 45 to provide a small amount of overhang so that only slight upward movement of the plunger 43 is capable of unseating the flap (see FIG. 6). The amount of overhang is precisely determined by positioning the flap by means of pins 46.

For the purpose of raising the plunger 43, a lower actuating shaft 50 is provided which is received in a transverse bore formed in the lower end of the mixing chamber and which has a cam surface 51 arranged to bear against the lower end of the plunger. Consequently, when the shaft 50 is rotated through a small angle the plunger is lifted, unseating the valve at its upper end for escape of the aerated cream contained in the batching chamber which then proceeds to flow through the annular clearance space between the bore for discharge at the nozzle 21.

In accordance with the present invention, the storage vessel 25 is connected to a source of gas at high pressure, the mixing chamber 30 is connected to a source of gas at an intermediate pressure, and valve means are provided to conduct the liquid cream from the storage vessel to the mixing chamber through a small orifice to insure intimate mixing of the cream and gas so that cream is discharged in whipped form when the discharge nozzle 21 is subsequently opened. Turning attention first to the connection between the vessel 25 and the mixing chamber 30, it will be noted in FIG. 2 that the vessel has a fitting 55 which is sealed to the upper end 56 of the mixing chamber by an O-ring 57. For supporting the vessel 25, the fitting 55 is screwed into a flange 58 secured to the platform 27. Extending vertically in the upper end of the chamber is a bore or conduit 59. To control the flow of cream a valve is provided including a transversely extending valve member 60 rotatable in a transversely extending tapered hole 61. The valve member 60 is maintained in a seated position by means of a coil spring 62 which is retained by a spring retainer member 63. The latter is screwed into the upper end of the batching chamber and is formed with wings 64 to permit unscrewing and removal of the valve member for cleaning purposes.

For the purpose of turning the valve 60, a valve operator 70 is provided which is rotated by a handle 22 and which has tongue-and-groove engagement with the valve as indicated at 72. To support the valve operating shaft 70, the same is received in a sleeve 75 screwed into the upper end of the batching chamber as indicated at 76. The valve member 60 is formed with a central transverse port 77 (see FIG. 2a) so that when the valve member is rotated into open position cream is able to flow through the conduit 59 and into the batching chamber 30.

For supplying pressurized gas, preferably nitrous oxide, to the storage vessel and mixing chamber at two different and predetermined pressures, a source of high pressure gas 80 is provided which is coupled to the system through pressure regulating valves. A first pressure regulating valve 81 has an input line 82 and an output line 83, with the latter being connected to the top of the vessel so that a high pressure, which may be monitored by a gauge 84, exists in the vessel. To establish a second and lower pressure for the mixing chamber, a second pressure regulating valve 85 is used having an input line 86 fed from the first pressure regulator and an output line 87 monitored by a second pressure gauge 88. The line 87 preferably enters the mixing chamber at the top to reduce the possibilities of the cream getting into the line. A check valve 89 protects the regulator valve against buildup of pressure in the reverse direction when the valve 60 is opened.

In accordance with one of the features of the invention, a spray head is provided at the point of inlet of the cream to the mixing chamber for breaking up the jets of incoming cream into fine droplets and for creating foam and turbulence in the mixing chamber so that a large amount of surface area is presented for substantially immediate absorption of the gas within the mixing chamber. In the present embodiment the spraying of liquid cream at high velocity is accomplished by a spray nozzle 90 (FIG. 7) screwed into the upper wall of the chamber in communication with the passage 59. Preferably the nozzle 90 is fitted with a plug 91 having helical ports to impart rotation to the stream as it passes through a restricted orifice 92, in much the same way as paint or other liquids are sprayed in finely divided form. Thus it will be apparent that when the valve 60 is opened the liquid cream from the pressure vessel at high pressure is rapidly forced through the conduit 59 and nozzle 90 into the chamber. The incoming cream, which crowds into the space within the mixing chamber, progressively raises the pressure within the chamber, reducing the pressure differential. The pressure in the chamber thus rises from its initial value, corresponding to the setting of the pressure regulating valve 85, to a higher value which corresponds to the setting of the pressure regulating valve 81. When such equalization of pressure occurs, the flow automatically ceases with a precisely predetermined amount of cream in the mixing chamber.

It is to be noted that the flow cuts off before the chamber is completely filled with liquid cream, and, if the cream after admission were in fact in liquid condition, it would rise to, say, the level indicated at 95 in FIG. 2. However, the cream is not liquid but in a semi-whipped state apparently filling the entire volume. The batching step in a practical case occurs quickly, within a few seconds, and when no further flow occurs, the valve 60 may be rotated to its closed position in readiness for discharge of the whipped cream from the discharge nozzle 21. The latter is brought about by rotating the operating shaft 50 (in FIG. 6) which unseats the flap 41 thus permitting the escape of the cream through the annular space surrounding the plunger 43. When the cream reaches the lower end of the plunger it is reduced to atmospheric pressure, expanding into whipped form.

In accordance with one of the aspects of the invention, means are provided for operating the inlet valve 60 and outlet valve 40 in sequence under the control of a single control handle so that during the initial portion of the movement only the upper or inlet valve is open and so that during the final portion of the movement only the lower or discharge valve is open, making it possible to secure an individual sized portion of whipped cream with a single easy movement and without conscious effort on the part of the waitress or other person using the device. For interlocking and synchronizing operation of the valve, a linkage generally indicated at 100 is provided which includes an upper crank member 101, a lower crank member 102 interconnected by a drop link 103. For the purpose of normally positioning the linkage in the "charge" position in which the upper valve is open and the lower valve is closed, the upper crank 101 is biased in the counterclockwise position by means of a spring 105 for engagement of a limit stop 106. For the purpose of defining the limit stop 106 and limiting the range of movement of the crank 101, the sleeve 75 is slotted as indicated at 107 (see FIG. 3) and the crank 101 is positioned on the operating shaft 70 so as to ride in the slot.

As a result of the above, the valve sequence is that which is indicated diagrammatically in FIG. 8. Assuming that the operating handle 22 starts from the initial or right hand position, the upper valve is open, the lower valve is closed and a charge of cream exists in the batching chamber. Movement of the operating handle 22 through the first half of its range of movement, i.e., to the vertical position, gradually closes off the upper or inlet valve 60 so that in this position both valves are closed. Further movement results in progressive opening of the lower or discharge valve 40. Discharge of the cream takes place promptly, in a matter of a second or two. When the handle is subsequently moved in the opposite direction assisted by the spring 105, the valve 40 is closed, causing gas pressure to be built up in the mixing chamber 30 via line 87. Completing this movement causes valve 60 to be opened to admit a jet of cream from the storage vessel, thus putting the device in readiness for a subsequent discharge cycle. Because of the simple control arrangement the cream whipping device may be operated by anyone without exercise of particular care or attention.

With regard to optimum pressure conditions, pressure differential of about 75 pounds per inch is preferred with the lower of the two pressures having a value on the order of 200 pounds per square inch. However, it is found that the low pressure and high pressure settings may be varied in absolute value and with respect to one another while still achieving satisfactory results. The pressure differential should lie within the range of up to about 175 pounds per square inch. In FIG. 9 the area enclosed by the triangle defines acceptable coordinate positions of operation; however, it is preferred this operation takes place above a mixing chamber gas pressure of 125 pounds per square inch, i.e., above the line 110 in the figure. It is possible in practicing the invention to employ even higher pressures falling to the right of the triangle and included in the triangle if extended, but this is not as economical since it requires correspondingly heavier equipment. Pressures below the triangle may be used but at a substantial sacrifice in the appearance and over-run of the whipped product. Differentials of somewhat less than 25 pounds per square inch may be used but with a sacrifice in discharge time.

It is one of the advantages of the above cream whipping device that liquid cream is used as a raw material, enabling the cost per serving of the shipped cream to be reduced to a minimum. Moreover, liquid cream is more readily available than whipped cream and the storage of vessel 25 may be replenished as necessary, depending upon the demand, even during periods such as holidays when supply of whipped cream from dairies in pressurized containers may be cut off. It is found that the quality of the cream employed using the present device improved over that which is available through the usual commercial channels, having optimum overrun on the order of six or more with a high degree of consistency from batch to batch and from the beginning to end of each of the batches. It is to be particularly noted that high velocity discharge from the inlet nozzle 90 efficiently agitates the cream for immediate dissolving of the rated amount of gas without necessity for any mechanical agitators and the complication of driving and sealing such mechanisms.

In order to maintain the mixing chamber at a low temperature it is preferably lagged with insulation and, if desired, the insulated housing 16, which is refrigerated, may be extended downwardly as necessary to enclose the mixing chamber.

It is one of the further features of the present invention that the device may be easily taken apart with all surfaces exposed for cleaning as required by health regulations. To disassemble the unit, pressure is first released in the upper vessel. This may be done by setting the pressure regulators to zero and by venting the vessel to the atmosphere by loosening the connection; or if desired, a three way valve may be used for venting purposes. The vessel may then be simply unscrewed from the supporting flange 58. Following this, the batching and whipping chamber may be removed by rotating it bodily, bringing about disconnection at the upper bayonet connection 36. Following this the lower portion of the chamber 32 may be removed by freeing the bayonet connection 33 which exposes the valve flap 41 and valve plunger 43. Removal of the rubber flap 41 enables the plunger 43 to be displaced upwardly thereby freeing the operating shaft 50 so that it may be removed endwise. At the upper end of the chamber, the valve 60 may be removed by unscrewing the retainer 63, and the valve operating shaft 70 may be freed by rotating the sleeve 75 to unscrew it from the chamber. A bottle brush may be run through all of the openings. The entire process of disassembly takes but a few minutes' time.

It is to be understood that the form of the invention shown and described herein is to be taken as a preferred embodiment of the same and that various changes may be made in the shape, size and arrangement of parts without departing from the spirit of this invention or from the scope of the subjoined claims.

We claim as our invention:

1. An apparatus for saturating liquid cream with pressurized aerating gas and for discharging it to the atmosphere in whipped form in predetermined individual sized servings comprising, in combination, an enclosed mixing chamber of relatively small volume, means including an aerating pressure supply line having a first pressure regulating valve for conducting aerating gas into the mixing chamber with the same in an empty state so that said mixing chamber is filled with a charge of aerating gas at a predetermined pressure sufficient to produce aeration of liquid cream injected into the mixing chamber, a fixed spray head in said mixing chamber capable of producing a high velocity spray of droplets, an enclosed reservoir of liquid cream, conduit means including a main "on-off" valve for interconnecting the reservoir and the spray head, means including a second supply line having a second pressure regulating valve for conducting pressurized gas into said reservoir at a pressure which is substantially higher than the pressure in the low pressure line to create a pressure differential between the reservoir and the mixing chamber so that liquid cream is sprayed into the aerating gas in said mixing chamber at high velocity and in finely divided form accompanied by impingement of the spray upon the cream collecting in the mixing chamber for violent turbulence and foaming of the cream into semi-whipped form until the total volume of the sprayed cream increases to the point where the resultant increase in pressure in the mixing chamber approaches the pressure in the reservoir to terminate the flow of cream into said mixing chamber with the result that a predetermined metered batch of aerated cream proportional to the difference between said first and second pressures is deposited in the mixing chamber, and a discharge valve having an adjacent expansion nozzle at the mixing chamber together with means for unseating said discharge valve for permitting throttled and complete escape of the predetermined individual sized serving of pressurized aerated cream from the mixing chamber for expansion of the cream into whipped form in the nozzle as it strikes the atmosphere.

2. The combination recited in claim 1 including an operating means movable between limit positions and operatively coupled to said main valve and to said discharge valve so that the valves are individually opened as the operating means is moved to its respective limit positions and so that a single cycle of movement of the operating means produces transfer of a batch of liquid cream into the mixing chamber followed by complete discharge of said predetermined individual sized serving of cream into the atmosphere in whipped form from the discharge valve.

References Cited by the Examiner

UNITED STATES PATENTS

| 245,528 | 8/81 | Marchand | 222—452 X |
|---|---|---|---|
| 706,884 | 8/02 | Beebe | 137—320 X |
| 1,958,938 | 5/34 | Bohandy | 261—19 |
| 2,250,300 | 6/41 | Goosman et al. | |
| 2,580,188 | 12/51 | Nilsen | 222—501 X |
| 2,645,380 | 7/53 | Donnelly | 222—451 X |
| 2,665,559 | 1/54 | Dexter | 261—140 X |
| 2,974,453 | 3/61 | Meshberg | 141—20 X |
| 3,019,185 | 1/62 | Fouilland et al. | 210—205 |
| 3,074,700 | 1/63 | Buttner et al. | 261—140 X |

FOREIGN PATENTS

| 507,703 | 6/39 | Great Britain. |
| 690,067 | 6/30 | France. |

HARRY B. THORNTON, *Primary Examiner.*

CHARLES SUKALO, HERBERT L. MARTIN,
*Examiners.*